United States Patent [19]
Karell

[11] Patent Number: 6,091,321
[45] Date of Patent: Jul. 18, 2000

[54] METHOD AND APPARATUS OF A VIBRATORY INDICATOR FOR USE IN VEHICLES

[76] Inventor: Manuel L Karell, 3573 - 22 St., SF, Calif. 94114

[21] Appl. No.: 09/224,258

[22] Filed: Dec. 30, 1998

[51] Int. Cl.[7] .................................................. B60Q 1/00
[52] U.S. Cl. ...................... 340/425.5; 340/438; 340/439; 340/457; 340/458; 340/459; 340/475
[58] Field of Search ................................ 340/425.5, 426, 340/438, 439, 457, 458, 459, 475, 539, 309.15

[56] References Cited

U.S. PATENT DOCUMENTS

| | | | |
|---|---|---|---|
| 5,647,633 | 7/1997 | Fukuoka | 297/217.7 |
| 5,684,462 | 11/1997 | Gold | 340/576 |
| 5,686,882 | 11/1997 | Giani | 340/407.1 |
| 5,870,020 | 2/1999 | Harrison, Jr. | 340/426 |

*Primary Examiner*—Daryl Pope

[57] ABSTRACT

A method and apparatus to alert a driver by use of vibratory indicator, which may be located within a seat or on a driver's person. An example is an uncancelled turn signal indicator which senses that the turn signal indicator has been selected for more than an appropriate period of activation and upon sensing this condition, the driver's seat vibrates alerting the driver of the presence of this condition. Other indicators within vehicles use vibratory means to alert the driver. The vibratory indicator may be used as back-up to audible or visual indicators.

9 Claims, 4 Drawing Sheets

METHOD AND APPARATUS OF A VIBRATORY INDICATOR FOR USE IN VEHICLES

BRIEF SUMMARY

1. Technical Field

This invention relates generally to indicators in vehicles, especially towards using an indicator which vibrates.

2. Background Art

A vehicle turn signal indicator may inadvertently be left activated. Leaving a turn signal unintentionally actuated may be hazardous to drivers in the vicinity. There are self canceling devices as in U.S. Pat. No. 4,333,071 to Kira, 1980, in which a turn signal is automatically terminated. However, this action removes the driver from the decision process. Other devices may use visual or auditory means to alert a driver to an uncancelled indicator as in U.S. Pat. No. 4,907,844 to White, 1990. However, auditory and visual indicators may not be recognized; for example, a hard-of-hearing person may not hear the signal or a non-alert driver may fail to notice a visual indicator. Thus, a need continues to exist for an additional alerting indicator.

DISCLOSURE OF THE INVENTION

This need and others are substantially met through provision of the Vibratory Indicator for use in Vehicles. A first configuration of the present invention functions in conjunction with a vehicle having at least one turn signal indicator. An uncancelled turn signal indicator includes generally a comparer means and a logic assessing means which are used together for determining when a turn signal has not been appropriately terminated. Operably connected is a trigger to turn on a vibration, for example, a vibration within a seat. The vibrator may be an additional alerting indicator, or may be solely used. The comparer means and the logic assessing means may have speed sensors, turning sensors, activation/deactivation sensors, duration sensors, acceleration/deceleration sensors, centripetal/centrifugal sensors, or other sensors for determining the correctness of the signal activation. Thus, the logic assessing means and comparer means upon determining when a turn signal has not been appropriately terminated triggers a vibratory indicator to provide an alerting indication to the vehicle driver that the turn signal indicator has not yet been cancelled. The means for triggering may be located within the sensor housing or may be within the vibrator housing. The means for activation of a vibration within a seat may be hard wired, for example, wires from the turn signal going to a vibratory inducing motor attached to or operatively connected to a seat; or wireless, for example, a FM signal originating anywhere within the vehicle and going to the vibrator. The vibration within a seat may be accomplished by any means causing a vibration or simply with a standard vibrator motor mechanism. Or the vibrator may be placed on the body of the driver, such as with a personal vibrating pager. Single or multiple vibratory motors may be utilized.

Other configurations may use a vibratory indicator in conjunction with any other indicator within a vehicle of the class, but not limited to the class of: check engine, door ajar, oil pressure, hot radiator, low tire pressure, low battery, air bag malfunction, brake malfunction, awake/sleep sensor, imminent collision sensors, and others.

Thus, any and all of the numerous etiologies for maintenance evaluation may trigger a vibration. Any and all of the numerous indicators used in vehicles, whether automobile, train, motorcycle, airplane, and others may trigger a vibration. A vibration trigger mechanism may be operatively attached to an awake/sleep sensor to help prevent an accident induced by sleep deprivation, sleep apnea, insomnia or other causes.

Also, the vibration may be manually turned off by the driver with a manual shut-off switch. The vibration levels may be adjusted manually to be increased or decreased as needed by the driver to alert but not startle. The vibration levels may be increased for increasing emergent situations.

BRIEF DESCRIPTION OF THE DRAWINGS

These and other attributes of the invention will become more clear upon making a thorough review and study of the following description of the best mode for carrying out the invention, particularly when reviewed in conjunction with the drawings, wherein.

BEST MODE FOR CARRYING OUT THE INVENTION

Figure 1:
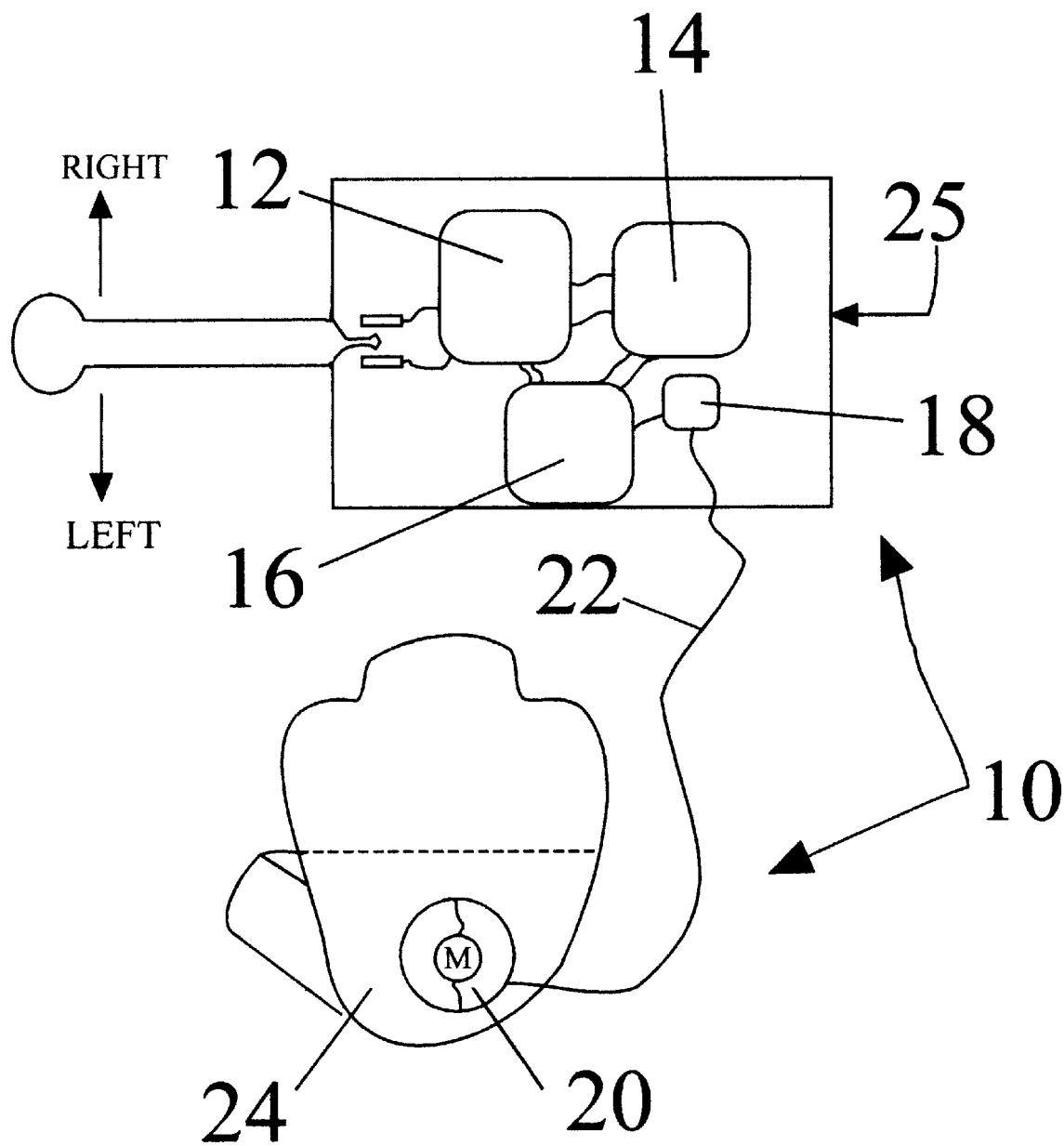
FIG. 1 comprises a schematic diagram of the instant invention configured to work with a turn signal indicator having an indicator sensing means, a comparer means, a logic means, a trigger means and finally, a vibratory indicator means.

The instant invention as generally represented by numeral (10) is shown in FIG. 1 configured to function with a turn signal within a vehicle. In most vehicles, the turn signal located on the shaft of the steering wheel, is pushed upwards to indicate turning right and is pushed downwards to indicated turning left. The activation of the turn signal indicator causes an indicator sense means(12) to send a signal to a comparer means(14) which is operably connected to a logic means(16). The comparer means(14) and the logic means(16) work together to determine that a specific parameter is present, and on doing so send a signal to a trigger means(18). The trigger means then activates the vibrator indicator means(20).

In operation, a driver activates the turn signal which is sensed by the indicator sense means(12). If a situation were to arise where the driver inadvertently left the signal on too long and did not turn, then the comparer means(14) in conjunction with the logic means(16) determines that it is in fact an inadvertent signal, which would cause the trigger means(18) to send a signal via wires(22) to the vibratory indicator means(20). The vibratory indicator means(20) in this configuration is located within a vehicle seat(24). The vibration produced would then alert the driver that a response is required. An energy source required for operation, for example, direct energy from vehicle battery or separate batteries within, is well known in the art and is not discussed here.

Figure 2:
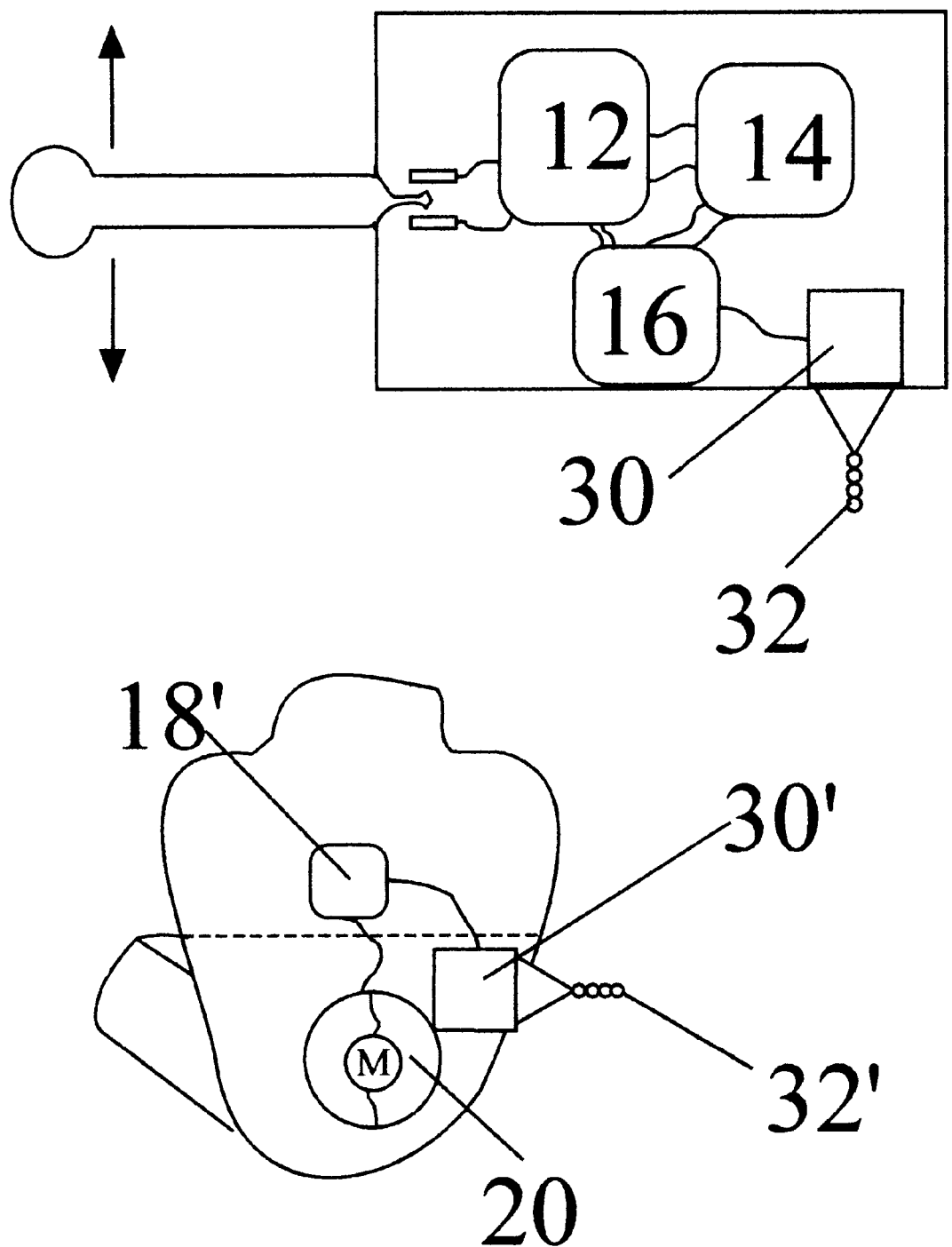
FIG. 2 comprises a schematic diagram of the instant invention configured to work with a turn signal wherein a transmit/receive communication element is present.

In FIG. 2 the instant invention is configured without wires. Thus the logic means(20) activates a communication element means(30) to send a signal through transmitter antennae(32) which is received by auxiliary antennae(32')

and auxiliary communication element means(30'), which in turn sends a signal to trigger means(18') and thus triggering vibratory indicator means(20).

Figure 3:
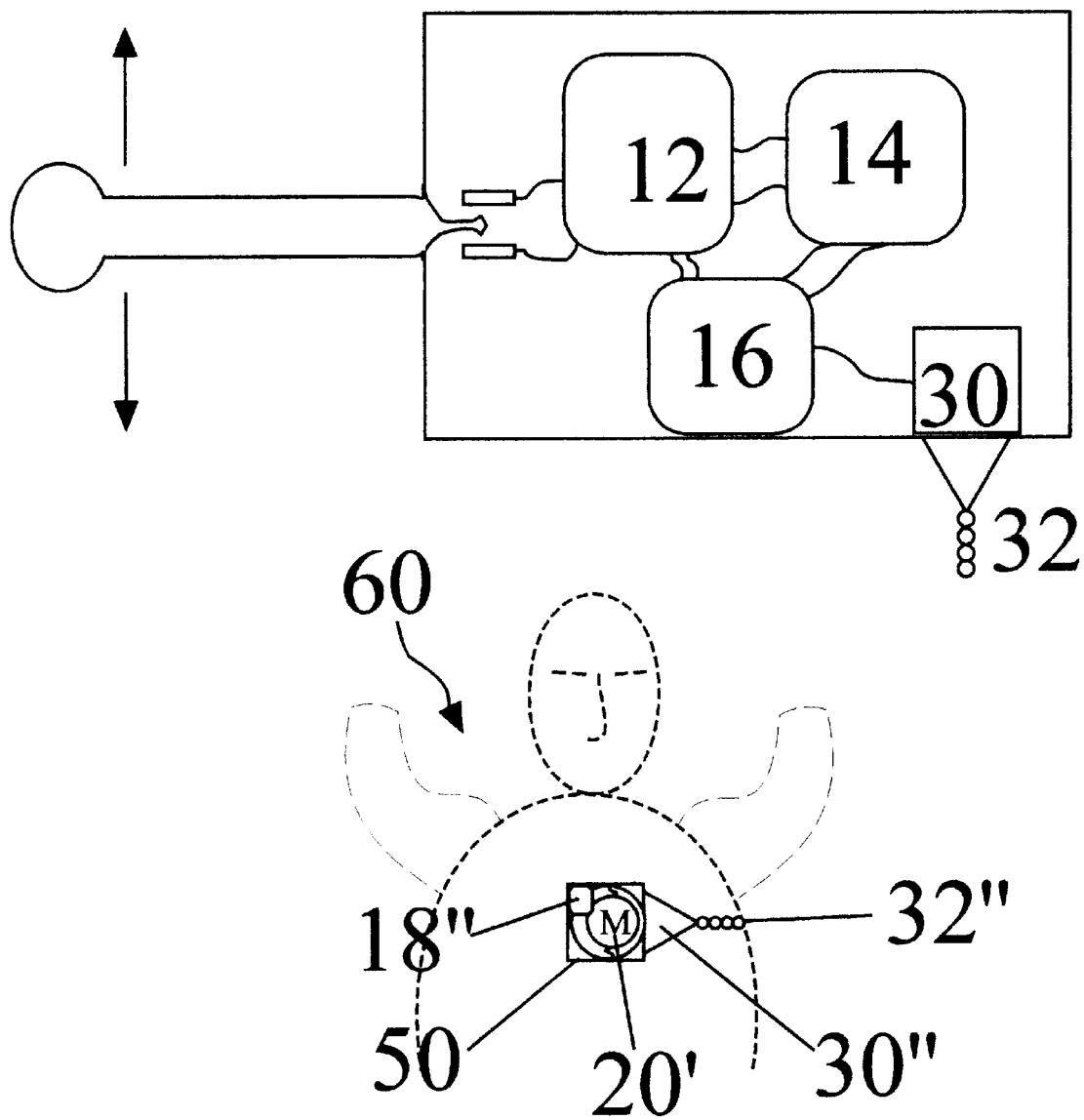
FIG. 3 comprises a schematic diagram of the instant invention wherein a vibratory indicator means is located on a driver's person, as in a personal pager.

In FIG. 3 the instant invention is configured to function with a personal pager(50) located on a driver's person(60). Thus the logic means(20) activates a communication element means(30) to send a signal through transmitter antennae(32) which is received by auxiliary antennae(32") and auxiliary communication element means(30"), which in turn sends a signal to trigger means(18") and thus triggering vibratory indicator means(20').

Figure 4:
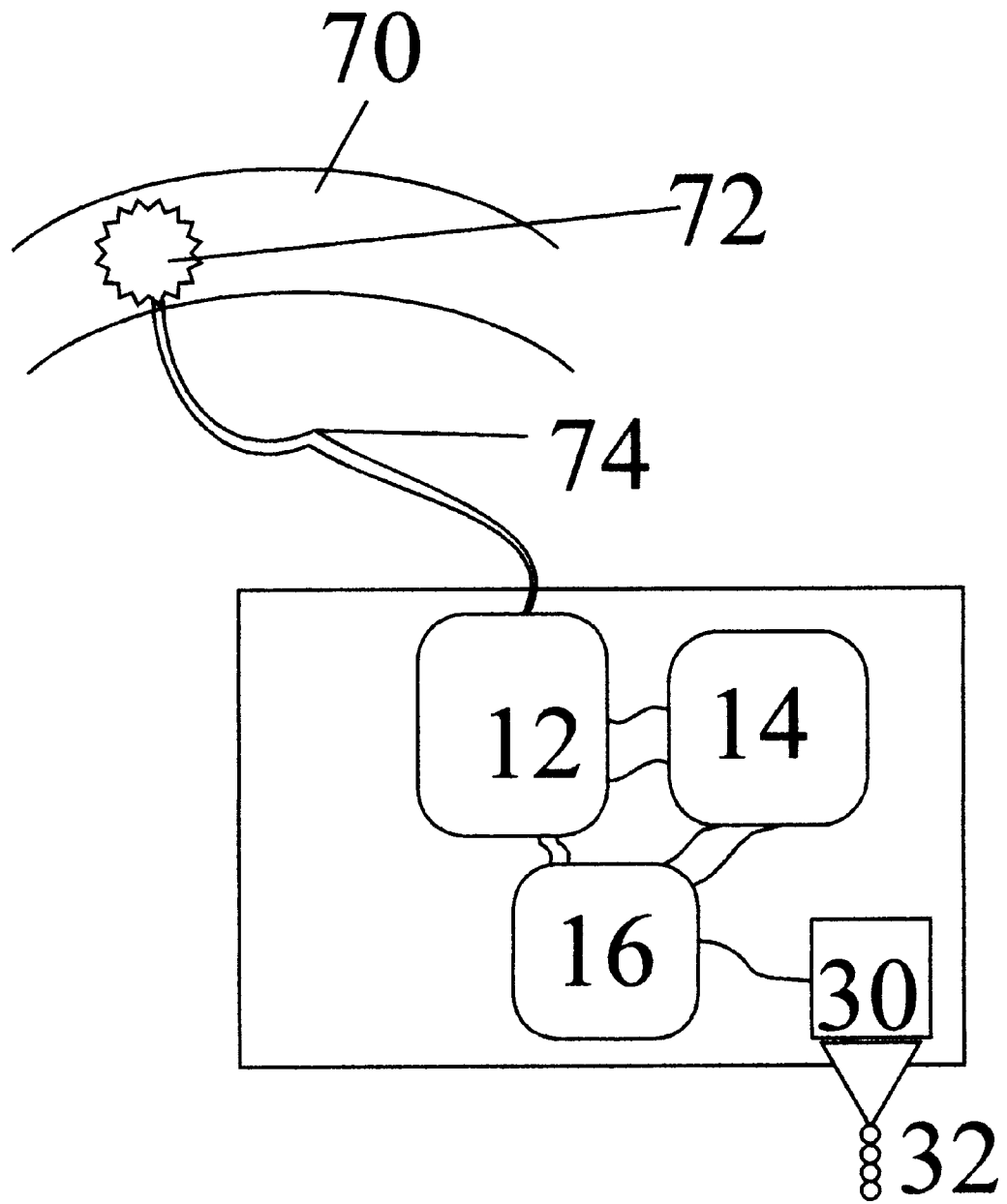
FIG. 4 comprises a schematic diagram of the instant invention wherein a visual indicator from the dashboard of the vehicle triggers the vibratory indicator means.

In FIG. 4 the instant invention is configured to function with any vehicle indicator(72), an example shown here an indicator within the dashboard(70) and connected with wires (74) to an indicator sensing means(12). Not shown are other configurations wherein other indicators, for example, a sleep indicator would initiate a driver response after the driver received a vibration. U.S. Pat. No. 4,907,844 is disclosed and is incorporated herein by reference. This patent teaches auditory and visual indicators rather than a vibratory indicator, but in all other respects provides appropriate techniques and devices amenable to the practice of the instant invention.

I claim:

1. An apparatus, within a vehicle, or train, or airplane having turn signal indicators, for alerting a person that an action is needed, said apparatus comprising:

an indicator sense means for sensing activation of the turn signal indicators and providing a response;

an uncancelled turn signal indicator for receiving and comparing said response, to predetermined parameters, and logically determining when said vehicle turn signals have not been terminated in an appropriate manner, thereby providing an uncancelled turn signal; and a trigger means responsive to said uncancelled signal for triggering a vibratory indicator means for alerting said person, wherein said vibratory indicator means is included in a device located on said person.

2. An apparatus of claim 1 wherein said indicator sense means and/or vibratory indicator means further comprises a communication element means for transmitting and receiving signals.

3. An apparatus of claim 2 using wireless transmission.

4. An apparatus of claim 1 wherein said vibratory indicator means comprises a personal pager.

5. An apparatus of claim 4 wherein said personal pager is a vibratory alerting device comprising:

a supporting structure; and electrically operated signal processing means in said structure for providing an alerting signal; an electric-energy-cell means for providing power to said signal processing means; a housing means for holding said cell means in said structure; and a motor means responsive to said alerting signal for imparting to said cell means vibratory motion within said housing means.

6. An apparatus of claim 1 wherein said indicator sense means is for responding to an auditory or visual indicator within said vehicle or train or airplane.

7. An apparatus of claim 6 wherein said indicator sense means is for responding to a vehicular auditory uncancelled turn signal indicator.

8. An apparatus of claim 6 wherein said indicator sense means is for responding to a vehicular visual uncancelled turn signal indicator.

9. A method wherein a driver or person is alerted to an uncancelled turn signal comprising the steps of:

a) sensing when an uncancelled turn signal indicator activates;

b) transmitting a signal to and triggering a vibratory indicator that is located on the driver or person, and not in the driver's or person's seat, thus alerting the driver or person to the existence of the uncancelled turn signal.

* * * * *